UNITED STATES PATENT OFFICE.

EDWARD C. BROADWELL, OF PHILADELPHIA, PENNSYLVANIA, ASSIGNOR OF ONE-THIRD TO MOSES PAXSON, OF SAME PLACE.

SOLDER FOR SOLDERING ALUMINIUM.

SPECIFICATION forming part of Letters Patent No. 585,551, dated June 29, 1897.

Application filed February 10, 1894. Serial No. 499,773. (No specimens.)

*To all whom it may concern:*

Be it known that I, EDWARD C. BROADWELL, a citizen of the United States, and a resident of the city and county of Philadelphia and State of Pennsylvania, have invented a new and useful Improvement in Solders for and Method of Soldering Aluminium, of which the following is a clear and sufficient specification.

My invention consists of an alloy which can be used to solder together two or more pieces of aluminium. This alloy is composed of magnesium and some other metal or alloy that is capable of alloying with or uniting itself to aluminium when the latter is clean and has its surface free from oxid of aluminium. This condition of the aluminium is of course impossible to obtain when the articles of aluminium are soldered together in practical operation. The magnesium in the alloy above mentioned, when said alloy is applied as is done in the operation of soldering, acts to remove the film of oxid from the surface of the aluminium and the other constituent or constituents as a filler or binder.

Describing now the method of preparing the alloy in the best manner and in the best proportions of which I am now aware, I place in the melting-pot tin to the amount of, say, forty-five per cent. of the material of the alloy. After this has melted I place in the same about ten per cent. of magnesium and cover the contents of the pot with a suitable covering material, such as cryolite, and then preferably add, say, forty-five per cent. of zinc. After the materials have been thoroughly mixed the alloy formed can be cast into sticks or other suitable shapes. The alloy then can be used in a similar manner to other soldering-alloys—viz., melting and applying to the surfaces of the pieces of aluminium to be joined together.

With the magnesium I can use tin alone and in fact can, as I have above stated, use any metal or alloy capable of alloying with or joining or attaching itself to aluminium when the latter is in the condition above stated. I do not therefore limit myself to the particular metals set forth above, nor to the particular proportions. As low as one per cent. of magnesium has been found to give good results, and a very high percentage can also be utilized. Besides this, I do not limit myself to an alloy prepared in the particular method above described, as I believe that many other methods may be employed by a man skilled in preparing alloys.

I do not confine myself to the particular filling materials which I have mentioned, as other filling materials may be used, and such filling materials will vary with the kind of solder (whether hard or soft) that is intended to be produced. I mean by "filling material" the material which forms the permanently remaining or connecting mass between the surfaces to be joined or in the apertures to be filled, &c.

Having now described my invention, what I claim, and desire to secure by Letters Patent, is—

1. A solder for aluminium consisting of magnesium and a filling material that has sufficient affinity for aluminium to join itself thereto when said aluminium is substantially free from aluminium oxid, said magnesium being in sufficient quantity to reduce sufficiently the oxid of aluminium upon the aluminium to which the solder is to adhere substantially as described.

2. A solder for aluminium consisting of a metallic mixture containing magnesium and tin said magnesium being in sufficient quantity to so reduce the aluminium oxid on the aluminium to which the solder is to adhere to allow of the adherence of such solder substantially as described.

3. An alloy for soldering aluminium consisting of magnesium tin and zinc substantially as described.

4. A solder for aluminium consisting of a mixture of a substance having a greater affinity for oxygen than has aluminium, and capable of reducing aluminium oxid through the application of heat, and a filling material capable of attaching itself to the aluminium, substantially as described.

In witness whereof I have hereunto set my name in the presence of two subscribing witnesses.

EDWARD C. BROADWELL.

Witnesses:
MARK WILKS COLLET,
ARTHUR JOHN KERSHAW.